United States Patent [19]

Koenig et al.

[11] Patent Number: 4,795,791

[45] Date of Patent: * Jan. 3, 1989

[54] METHOD FOR INCREASING THE FUNCTIONALITY OF AN EPOXY RESIN

[75] Inventors: Raymond A. Koenig, Vendenheim, France; Günter H. Häertel, Buehl, Fed. Rep. of Germany

[73] Assignee: The Dow Chemical Company, Midland, Mich.

[*] Notice: The portion of the term of this patent subsequent to Feb. 2, 2005 has been disclaimed.

[21] Appl. No.: 125,907

[22] Filed: Nov. 27, 1987

Related U.S. Application Data

[63] Continuation of Ser. No. 766,035, Aug. 15, 1985, Pat. No. 4,722,990.

[30] Foreign Application Priority Data

Aug. 16, 1984 [GB] United Kingdom ................. 8420817

[51] Int. Cl.⁴ ............................................. C08G 59/14
[52] U.S. Cl. ..................................... 525/523; 528/95; 528/104; 528/361; 528/365
[58] Field of Search ................. 528/95, 104, 361, 365, 528/409, 89, 93; 525/523

[56] References Cited

U.S. PATENT DOCUMENTS

| | | | |
|---|---|---|---|
| 3,006,891 | 10/1961 | Nikles | 528/95 |
| 3,006,892 | 10/1961 | Nikles | 528/95 |
| 3,294,865 | 12/1966 | Price | 528/112 X |
| 4,251,594 | 2/1981 | Davis et al. | 427/372.2 X |
| 4,358,578 | 11/1982 | Brownscombe | 528/95 |

Primary Examiner—Earl Nielsen

[57] ABSTRACT

Epoxy resins of increased functionality are prepared by branching the epoxy resin in the presence of a lithium or cesium compound as a branching catalyst until the desired functionality is obtained and thereafter terminating the branching reaction. Since the lithium and cesium compounds are not deactivated by the aliphatic chloride typically found in an epoxy resin, the branching reaction can effectively be conducted even at low concentrations of the lithium or cesium compound. Termination of the branching reaction is conducted by cooling the branching reaction mixture or by the addition of a deactivating agent which stops or effectively reduces the rate of the branching reaction. Due to the low concentration at which the branching catalyst can be employed, the resulting branched epoxy resins can be prepared without visible turbidity.

9 Claims, No Drawings

METHOD FOR INCREASING THE FUNCTIONALITY OF AN EPOXY RESIN

CROSS-REFERENCE TO RELATED APPLICATION

This is a continuation of application Ser. No. 766,035, filed Aug. 15, 1985, now U.S. Pat. No. 4,722,990.

BACKGROUND OF THE INVENTION

The present invention relates to a method for increasing the functionality of an epoxy resin.

Due to their desirable physical and chemical properties such as resistance to chemical attack and excellent strength, toughness and adhesion, epoxy resins are useful in a wide variety of commercial applications such as protective coatings, adhesives, civil engineering applications including floorings and mortars as well as structural applications and reinforced plastics.

Conventionally, the molecular weight of an epoxy resin is increased by the advancement reaction of a polyepoxide such as the diglycidylether of bisphenol A with a polyhydric phenol such as bisphenol A. For example, U.S. Pat. Nos. 3,006,891 and 3,006,892 described the advancement of a lower molecular weight polyepoxide such as the diglycidylether of a bisphenol with a dihydric phenol using lithium hydroxide or a lithium salt such as lithium chloride as the advancement catalyst. The resulting epoxy resins are essentially linear 1,2-epoxy resins exhibiting a functionality of 2 or slightly less than 2. More recently, advancement reactions have been catalyzed using a tertiary amine or phosphine such as benzyl dimethyl amine; quaternary ammonium or quaternary phosphonium compound such as benzyl trimethyl ammonium chloride and ethyl triphenyl phosphonium acetate. See, for example, U.S. Pat. Nos. 3,377,406 and 3,908,855.

In many applications, particularly those applications in which better high temperature performance and/or chemical resistance is needed, it is often desirable to employ an epoxy resin having an average epoxy functionality greater than 2 as the sole epoxy resin component or in combination with a more conventional difunctional epoxy resin. One method for increasing the epoxy functionality consists of adding a polyfunctional epoxy resin such as an epoxy novolac resin to the epoxy resin formulation. The epoxy novolac resin which is commonly the reaction product of epichlorohydrin with the reaction product of a phenol and formaldehyde is conventionally prepared at an average epoxy functionality of from 2.2 to 8 epoxy groups per molecule. However, these polyfunctional epoxy compounds are relatively expensive materials. In addition, the reactivities of the epoxy groups of the epoxy novolac resin or other polyfunctional epoxy resin and the epoxy groups of a more conventional difunctional epoxy resin such as the diglycidyl ether of bisphenol A are often different. These differences in reactivity of the epoxy groups can cause embrittlement or other problems upon curing a blend containing the two resin types. Moreover, in commercial application, due to the relatively high viscosities of the epoxy novolac resin, special processing equipment is often required.

Various phosphonium acid salt catalysts have been shown to increase the epoxy functionality, by branching, of an epoxy resin. However, these phosphonium acid catalysts must be employed in a relatively large amount to provide sufficient branching to significantly increase the epoxy functionality of the resin and the degree of reaction is difficult to control. See, for example, U.S. Pat. No. 4,352,918.

Alternatively, U.S. Pat. No. 4,251,594 teaches the preparation of an advanced epoxy resin having increased functionality resulting from branching reactions by reacting an epoxy resin which contains at least 500 ppm of an aliphatic halide with a dihydric phenol using an alkali metal hydroxide, preferably sodium or potassium hydroxide catalyst, in an amount of from 0.5 to 1 hydroxide equivalent per aliphatic halide equivalent in the reaction mixture. This aliphatic halide, e.g., chloride, is a residue formed during the preparation of the epoxy resin which is commonly prepared from epichlorohydrin and a bisphenol. The effective amounts of the hydroxides are stated to be dependent on the aliphatic halide content of the resin which unfortunately varies for different batches of the resin. Specifically, the reference teaches that the halide deactivates the alkali metal hydroxide catalyst by formation of the halide salt. This is a deficiency in the disclosed method.

In view of the deficiencies in the prior art methods for preparing epoxy resins having an average functionality of greater than two, it remains highly desirable to provide a method for preparing an epoxy resin having increased functionality which method does not exhibit the deficiencies of the prior art.

SUMMARY OF THE INVENTION

The present invention is a method for increasing the functionality of an epoxy resin which comprises branching the epoxy resin in the presence of an amount of a lithium or cesium compound sufficient to catalyze the branching reaction, continuing the branching reaction until desired functionality is obtained and thereafter terminating the branching reaction.

As used herein, the term "branching" refers to the addition of epoxy functionality to an epoxy resin by the epoxy-epoxy and/or the epoxy-hydroxy reaction of different epoxy resin molecules.

In the practice of the present invention, the epoxy resin component(s) and the branching catalyst are contacted at conditions sufficient to branch the epoxy resin to the desired extent.

Surprisingly, and contrary to the teaching of U.S. Pat. No. 4,251,594, it has been found that the lithium and cesium compounds are not deactivated by the presence of aliphatic halide in the reaction mixture and will effectively branch the epoxy resin at low concentrations. Therefore, the branching proceeds independent of the aliphatic halide content in the reaction mixture. Moreover, due to the low concentration at which the lithium and cesium compounds can be employed to catalyze the branching reaction, the branched epoxy resins can be prepared without visible turbidity. Due to the relatively larger amounts of potassium and sodium required to catalyze the branching reaction, the insolubility of the potassium or sodium halide salts in the rein results in resins of turbid appearance unless the salts are subsequently removed.

The method of the present invention is useful in effectively and economically preparing branched epoxy resins, particularly solid epoxy resins.

DETAILED DESCRIPTION OF THE INVENTION

The epoxy resins of higher functionality prepared by the method of the present invention can be employed as a sole epoxy resin component or one of two or more epoxy resin components in an epoxy resin formulation. In addition, it can be used as a replacement, partial or complete, for an epoxy novolac resin to increase the functionality of an epoxy resin composition. Epoxy resin formulations prepared from the epoxy resin of higher functionality are useful in a wide variety of end-use applications including those applications where performance at higher temperatures and/or better chemical resistance are required such as in electrical laminates, structural adhesives, potting and molding compounds, civil engineering applications, reinforced plastics and protective coatings as well as maintenance paints.

The method of the present invention for increasing the functionality of an epoxy resin can be employed in conjunction with essentially an epoxy resin, i.e., any compound which possesses more than one 1,2-epoxide group. In general, the epoxy resin component is saturated or unsaturated aliphatic, cycloaliphatic, aromatic or heterocyclic and can be substituted with one or more non-interfering substituents such as heteroatoms, e.g., halogen, phosphorous, sulfur, silicon or nitrogen atoms; hydroxyl groups and ether radicals. Epoxy resin components can be monomeric or polymeric.

Epoxy resins are well-known in the art and reference is made thereto for the purposes of this invention. Illustrative examples of epoxy resins useful herein are described in *The Handbook of Epoxy Resins* by H. Lee and K. Neville, published in 1967 by McGraw-Hill, New York, in appendix 4-1, ppgs 4-35 through 4-56 and U.S. Pat. Nos. 2,633,458; 3,477,990 (particularly column 2, line 39 to column 4, line 75); 3,821,243; 3,980,719; 3,975,397 and 4,071,477 and G.B. Patent Specification No. 1,597,610, all of which are incorporated herein by reference.

Epoxy resins of particular interest in the practice of the present invention include the diglycidyl ethers of bisphenol compounds, particularly those compounds represented by the following general structural formula:

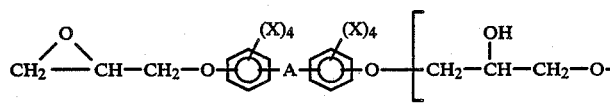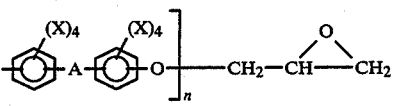

(I)

wherein each A is independently a divalent hydrocarbon group having from about 1 to about 8 carbon atoms, —C(O)—, —O—, —S—, —S—S—, —S(O)$_2$—, —S-(O)— or a covalent bond; each X is independently hydrogen, halogen or an alkyl group of about 1 to about 4 carbon atoms and n has an average value of 0 to about 35, preferably from 0 to about 10; the value of n being primarily dependent on the degree of advancement of the resin and the diglycidyl ethers of polyglycols such as the diglycidyl ether of polypropylene glycol. Epoxy novolac resins are generally at an average epoxy functionality from 2.2 to 8 whereas the triglycidyl ethers of tris(phenol) methane have an average epoxy functionality of 3 and further increases in functionality of these epoxy resins are not normally required. However, the method of the present invention can suitably be employed in increasing the functionality of these resins, if so desired. In addition, mixtures of one or more epoxy resins are also usable in this invention.

Preferred epoxy resins are the polyglycidyl ethers of bisphenol compounds of formula (I) wherein each A is independently a divalent hydrocarbon group having from about 1 to about 6 carbon atoms, each X is independently hydrogen, bromine or chlorine and n has an average value of from 0 to about 8.

Lithium compounds useful in the practice of the present invention are represented by the general structural formula Li$_m$X wherein X is an anionic moiety and m is the valence of the anion. Although not wishing to be bound by theory, it is believed that X should be an anionic moiety having a sufficiently high dissociation in the epoxy resin branching reaction mixture so as to produce free monovalent Li$^+$ cations. Frequently, the catalyst dissociation is evidenced by the solubility of the lightium or cesium compound in the branching reaction mixture. By the term "soluble" it is meant that the lithium or cesium hydroxide or salt does not cause the branching reaction mixture to appear visibly turbid or exhibit an opaque (non-transparent) appearance.

Representative lithium compounds useful as branching catalysts include lithium salts of the foregoing formula wherein X is a halide, for example, chloride or bromide; X is the anion of an organic acid such as R(COOH)$_n$ wherein n is the number of carbolyic acid groups, preferably about 1, and R is a hydrocarbon or inertly substituted hydrocarbon such as an alkyl, cycloalkyl, aryl or aralkyl, for example, acetate, or naphthenate; X is an anion of an inorganic acid, such as, for example, nitrate or perchlorate; X is —OR or —R wherein R is as hereinbefore defined, for example, phenolate, bisphenolate, butyl and methanolate; or X is a moiety containing a heteroatom such as N, S, H, P, Al and the like for example, amide, sulfide and hydride. Various cesium and lithium compounds such as carbonate and sulfate, although usable as branching catalysts, are less preferably employed herein. They are not as soluble or catalytically active as other more preferred compounds.

Lithium and cesium hydroxide are also suitable catalysts in the present invention.

The preferred lithium compounds are lithium chloride, lithium bromide, lithium phenolate and lithium bisphenolate, with lithium chloride being the most preferred lithium salt. The preferred cesium compounds are cesium hydroxide and cesium chloride.

When employing a lithium compound as a branching catalyst, advantageously from about 0.1 to about 300, preferably from about 0.1 to about 100, more preferably from about 0.1 to about 30, parts of lithium calculated as elemental lithium are employed per one million parts of the epoxy resin in the branching reaction mixture. When employing a cesium compound, advantageously from about 2 to about 2000, preferably from about 20 to about 600, parts of cesium calculated as elemental cesium are employed per one million parts of the epoxy resin.

The temperatures at which the branching reaction is most advantageously conducted are particularly dependent on the specific epoxy resin and catalyst employed. In general, the branching reaction is advantageously conducted at temperatures from about 20° C. to about 250° C., preferably from about 140° C. to about 200° C.

The reaction is continued until a branched epoxy resin having the desired functionality is obtained. Since the lithium and cesium compounds are not simultaneously deactivated by aliphatic chloride as reaction proceeds, the branching reaction will continue indefinitely regardless of the amounts of aliphatic halide and lithium compound present. At this time, the branching reaction is terminated, i.e., the branching reaction is stopped or effectively reduced to a desirably low level such that further branching does not adversely affect the product or its handling characteristics. There are a variety of methods to effectively terminate the branching reaction. For example, the temperature of the branched reaction product can be rapidly decreased to a temperature at which the branching reaction no longer occurs to a substantial extent. Cooling of the reaction mixture by merely reducing the temperature such as by depositing the hot reaction mixture on a cooling drum or cooling belt is not generally practical. Specifically, in the preparation of a solid epoxy resin in granular form such as by flaking, it generally takes a relatively long time to empty the reaction vessel. Unfortunately, the portions of the reaction mixture which cannot immediately be emptied and cooled are further reacted which results in a product of non-uniform properties and handling characteristics.

A preferred method for cooling the branched reaction mixture comprises the addition of a solvent to the mixture, thereby diluting the mixture and reducing its temperature. The amounts of organic liquid which are added to cool the reaction mixture are dependent on the reaction temperatures and the temperature at which the reaction is effectively terminated. This method is particularly preferred when the branched resin is to be prepared as a solution in an organic liquid.

It is highly advantageous to terminate the branching reaction by the addition of a deactivating agent which stops or effectively reduces the rate of the branching reaction even at temperatures required to maintain the branched reaction product in a molten or liquid state. Although not bound by theory, it is believed that any material which is capable of combining, complexing or reacting with the lithium or cesium catalyst to form a compound which is only weakly dissociated or less soluble, as compared to the catalyst itself in the reaction product and which is simultaneously capable of blocking, by protonation, alkylation or other means, the active portion of the epoxy resin is suitably employed for such purpose herein. Representative of such deactivating agents which are advantageously employed herein include strong acids (i.e., acids having a $pK_a$ of about 2.5 or less at 25° C.) and their esters or anhydrides. Illustrative of deactivating agents useful herein include strong inorganic acids such as phosphoric acid, sulfurous acid or sulfuric acid; inorganic acid esters; half esters and partial esters such as dimethyl sulfate and monomethyl sulfate; inorganic acid anhydrides such as phosphoric acid anhydride ($P_2O_5$ or $P_4O_{10}$); strong organic acids, their esters and anhydrides, e.g., the alkyl, aryl and aralkyl sulfonic or sulfinic acids such as p-toluene sulfonic acid, methyl or ethyl-p-toluene sulfonate and p-toluene sulfonic acid anhydride. Various strong acids such as hydrochloric acid which forms the chloride salt of lithium or cesium—both active branching catalysts—are not suitably employed herein. Of the foregoing compounds, those preferably employed as deactivators herein include the alkyl, aryl and aralkyl sulfonic acids and the alkyl, aryl and aralkyl sulfonates. Most preferred are methyl-p-toluene sulfonate and p-toluene sulfonic acid.

In the practice of the present invention, the deactivator is employed in an amount sufficient to stop the reaction or to reduce the rate of branching reaction to a desirably low level such that further branching does not adversely effect the product or its handling characteristics. Although these amounts of deactivator will vary depending on the specific deactivator, catalyst and epoxy rein employed, the reaction conditions and desired degree of deactivation, the deactivator is generally added in an amount of at least one equivalent of the deactivator for each equivalent of branching catalyst. Preferably, the deactivator is employed in a slight excess, e.g., at least about 1.05 equivalents of the deactivator are added for each equivalent of branching catalyst in the branching reaction mixture. Although the maximum amount of deactivator added to the branching reaction mixture is dependent on the effect of the deactivator on the physical and chemical properties of the branched epoxy resin and products prepared therefrom as well as the additional cost incurred by adding greater than equivalent amounts of the deactivator, the deactivator can be added in an amount up to and exceeding about 5 equivalents of the catalyst. Most preferably, the deactivator is added in an amount of at least about 1.1 to less than about 2 equivalents for each equivalent of the branching catalyst.

To effectively deactivate the catalyst, upon addition of the deactivator to the branching reaction mixture, the reaction mixture is advantageously stirred so as to homogeneously disperse the deactivator through the reaction mixture. Most conveniently, the temperature of the reaction mixture when the deactivator is added is that temperature required for the branching when the desired branching has occurred.

Once the catalyst has been deactivated, the branched epoxy resin can be formulated into various formulations for use in a variety of end use applications.

In a preferred embodiment, the method of the present invention is characterized by advancing an epoxy resin of one molecular weight by reaction with a coreactive chain extender in the presence of an advancement catalyst to prepare a higher molecular weight epoxy resin and simultaneously and/or subsequently branching the epoxy resin in situ using a lithium or cesium compound as the branching catalyst. In said embodiment, the lithium or cesium compound is preferably employed in an amount such that the reaction mixture contains less than about 100, more preferably less than about 30, ppm of lithium calculated as elemental lithium or less than about 2000, preferably less than about 600, ppm of cesium calculated as elemental cesium, said amounts being based on the total weight of the epoxy resin and coreactive chain extender.

In the preferred embodiment wherein advancement and branching are conducted in situ (simultaneously and/or subsequently in a single reaction vessel), then n of Formula I is preferably from 0 to about 0.5, more preferably from 0 to about 0.25, whereas n will generally exhibit higher values when branching an advanced resin. When advancing and branching an epoxy resin in one reaction vessel, the epoxy resin is most preferably the liquid diglycidyl ether of bisphenol A.

Although any polyfunctional compound with more than about one, preferably about two, active hydrogen atoms per molecule, e.g., a difunctional acid such as a dicarboxylic acid can be employed to react with the epoxy groups thereby advancing the resin, in general, a polyol is typically employed in the advancement reaction. By the term "polyol" it is meant a compound having more than about one hydroxyl group reactive with the epoxide groups of the epoxy resin. The polyols can be saturated or unsaturated aliphatic, cycloaliphatic, aromatic or heterocyclic compounds which can also be substituted with a non-interfering substituent. The polyols can be monomeric or polymeric.

In general, the preferred polyols are dihydric phenols having the general structural formula:

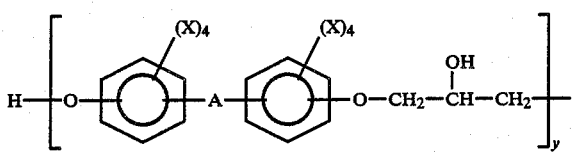 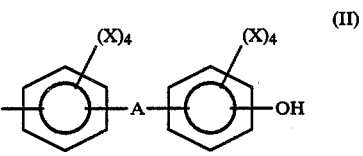 (II)

wherein A and X are as defined above in the description of formula (I) and y has an average value of from 0 to about 5, preferably from 0 to about 2. Also useful as polyols are the dihydric phenols such as catechol, resorcinol and hydroquinone. Mixtures of one or more polyhydric phenols are also suitably employed herein.

Preferably, the polyhydric phenol is a dihydric phenol of the general structure of formula (II) wherein A is a divalent hydrocarbon radical having from about 1 to about 8 carbon atoms, each X is individually hydrogen or halogen and y is 0. Dihydric phenols are most preferably employed herein, with 2,2-bis(4-hydroxy phenyl) propane, commonly referred to as bisphenol A (BPA), and tetrabromobisphenol A being most preferred.

The advancement of the epoxy resin is conducted in the presence of a catalyst for the reaction of the epoxide groups of the epoxy resin with the reactive groups of the polyfunctional component (i.e., polyol) to extend the chain of the epoxy resin thereby increasing its molecular weight.

Such catalysts are well-known in the art and reference is made thereto for the purposes of the present invention. Illustrative advancement catalysts which form higher molecular weight linear epoxy resins include the oniom compounds such as the quaternary ammonium compounds, e.g., the quaternary ammonium hydroxides as described in U.S. Pat. No. 4,168,331, such as tetramethylammonium hydroxide; quaternary ammonium salts and quaternary phosphonium salts such as ethyl triphenyl phosphonium iodide; and the tertiary amines and phosphines, e.g., benzyl dimethyl amine and triphenyl phosphine. Of the advancement catalyst, the oniom compounds and the tertiary amines are generally more advantageously employed.

The amounts of epoxy resin, polyol or other coreactive chain extender and advancement catalyst are generally employed in conventional amounts, although the amounts most advantageously employed are dependent on a variety of factors including the desired physical and chemical properties of the advanced epoxy resin and the conditions of the advancement reaction. In general, the advancement catalyst will be employed from about 1 to about 5000, advantageously from about 150 to about 2500, parts per million (ppm), by weight, based on the total weight parts of the epoxy resin and the coreactive chain extender.

In general, in the advancement reaction, the epoxy and coreactive chain extending components are employed in an amount such that the ratio of equivalents of active hydrogen containing groups reactive with an epoxy group to epoxy equivalents is from about 0.1:1 to about 1:1, preferably from about 0.2:1 to about 0.98:1.

In conducting the branching reaction, the lithium or cesium compound or mixture thereof can be added to the reaction mixture of any time prior to conducting the desired branching reaction. In addition, in the preparation of a branched epoxy resin of advanced molecular weight, the lithium or cesium branching catalyst can be added prior to or subsequent to the advancement of the epoxy resin. In general, whether to add the catalyst to the mixture of the low molecular weight epoxy resin and coreactive component or the advanced reaction mixture is dependent on the capability of the catalyst to dissociate in the reaction mixture and/or the advanced epoxy resin. For example, the lithium or cesium compounds can be and, often advantageously are, added after advancement when the particular compound being employed is soluble in the advanced epoxy resin. Surprisingly, although lithium chloride is apparently soluble at the low concentrations employed, in the advanced resin, lithium hydroxide (as well as other lithium and cesium compounds) are not apparently soluble to any significant design in the advanced epoxy resin. Due to this insolubility, lithium hydroxide and other lithium and cesium compounds having similar solubilities are advantageously added to the reaction mixture (i.e., the blend of the low molecular weight epoxy resin and polyhydric phenol, including any reaction diluent) prior to the advancement of the epoxy resin.

Preferably, the advancement and/or branching reaction is conducted neat. However, the advancement and/or branching can be conducted in the presence of a liquid reaction diluent which is liquid at reaction conditions employed. Preferably, the reaction diluent, if employed, is an organic liquid. The organic liquid reaction diluent is advantageously inert to the reaction and boils at a temperature above the temperature of reaction. Representative organic liquid reaction diluents which can be employed herein include the lower ketones such as acetone, methyl isopropyl ketone, methyl isobutyl ketone, cyclohexanone; and methyl ethyl ketone; various glycol ethers such as ethylene or propylene glycol monomethylether, diethylene glycol monobutylether or dipropylene glycol monomethyl ether and esters thereof such as ethylene glycol monomethylether acetate; and aromatic hydrocarbons such as toluene and xylene. Mixtures of one or more organic liquids can also be employed as the reaction diluent. If employed, the reaction diluent is generally employed in an amount from about 1 to about 90 weight percent based on the total weight of the reaction mixture, including diluents.

Minor amounts, e.g., up to about 5 weight percent (based on the weight of the total reaction mixture, including the reaction diluent) of a suitable solvent such as water or lower alcohol such as methanol or ethanol can be employed to solubilize the lithium or cesium compound prior to its introduction into the branching reaction mixture or to most effectively disperse the lithium or cesium compound in the epoxy resin reaction mixture. This solvent can be employed whether the reaction is conducted neat or in a reaction diluent.

The following examples are set forth to illustrate the invention and should not be construed to limit its scope. In the Examples, all parts and percentages are by weight unless otherwise indicated. In the Examples, the melt viscosity is the viscosity of the molten resin at the specified temperature as measured using an ICI cone and plate viscometer. The softening point is defined as a temperature at which the epoxy resin suspended in a cup with a 6.35 millimeter hole in the bottom flows downward a distant of 19 mm as a sample is heated at a linear rate in air. It was measured using techniques of ASTM test method D-3104.

The epoxide equivalent was determined by the titration method described in *The Handbook of Epoxy Resins* by H. Lee and K. Neville (supra), page 4–17, Table 4-12. The epoxy equivalent weight (EEW) as well as the percent epoxy groups can subsequently be determined from thus determined epoxide equivalent.

EXAMPLE 1

To a suitably sized reaction vessel equipped with a temperature control means, stirring device and nitrogen sparger, was added 800 grams (g) of a mixture containing 606.1 g of a diglycidyl ether of bisphenol A (EEW of 180) and 193.9 g of bisphenol A. The reaction vessel was then heated to 95° C. When the contents of the reaction vessel obtained this temperature, 0.2 g of a 70 percent solution of ethyltriphenyl phosphonium acetate-acetic acid complex advancement catalyst in methanol and 0.16 g of a ten percent solution of LiOH branching catalyst in water were added to the reaction vessel.

The active amount of advancement catalyst was 175 parts per million parts of the epoxy resin. The active amount of the LiOH branching catalyst was 20 parts per million parts of the epoxy resin and bisphenol A. This level of branching catalyst was calculated as 5.8 ppm of lithium as elemental lithium based upon the weight of the epoxy resin and bisphenol A, or 7.6 ppm based only upon the weight of the epoxy resin. The resulting reaction mixture which contains both the advancement and branching catalyst was heated to 150° C. At this temperature, the reaction mixture was found to exotherm, with the maximum temperature following the start of the exotherm ("exotherm temperature") being being 180° C. and 200° C. The temperature of the reaction mixture was maintained at 180° C.

When the EEW reached the desired EEW of 590 as evidenced by a desired reduction in the percent of epoxy groups in the reaction mixture, the reaction was terminated. In this example, the percent epoxy groups is reduced from 8.96 percent present in the initial reaction mixture, subsequent to advancement, to 7.29 percent in the final branched resin. This occurred about 2.25 hours after the initial exotherm. At this time, 0.16 g of methyl-p-toluene sulfonate was added, in one shot, to the reaction mixture. The reaction mixture was maintained at 180° C. for thirty minutes to allow the deactivator to be homogeneously mixed throughout the reaction mixture and to sufficiently terminate the branching chain propogation. Subsequent to this treatment, the reaction mixture was found to be stabilized and was flaked using conventional techniques.

The resulting branched epoxy resin had an average epoxy fucntionality of 2.6, a melt viscosity at 150° C. of 27.6 poise (2.76 Pa.s), a softening point of 93.1° C. and glass transition temperature of 48° C.

COMPARATIVE EXAMPLE A

For purposes of comparison, 650 g of molten, medium molecular weight solid resin, an essentially linear epoxy resin having an EEW of 970 and a functionality of about 2 was mixed with 150 g of an epoxy novolac resin which was the liquid reaction product of epichlorohydrin and a phenol formaldehyde type resin having an EEW of 180, a functionality of 3.6 and a viscosity at 52° C. of 35,000 millipascals (mPa.s). The resulting blend exhibited an EEW of 535 with an average functionality of about 2.6.

The melt viscosity, the softening point and glass transition temperature were essentially the same as those exhibited by the branched epoxy resin which was prepared in Example 1.

EXAMPLE 2

A branched epoxy resin was prepared using identical techniques and materials as employed in Example 1 except that 0.7 g of a 70 percent solution of ethyl triphenyl phosphonium acetate-acetic acid complex in methanol was employed as the advancement catalyst and 0.01 g of lithium hydroxide as the branching catalyst. This level of branching catalyst was calculated as 3.6 ppm of lithium as elemental lithium based upon the weight of the epoxy resin and bisphenol A, or 4.8 ppm based only upon the weight of the epoxy resin. The conditions of the reaction mixture during branching were maintained at 180° C. The desired EEW was obtained after two hours and 40 minutes. The reaction mixture was then stabilized using methyl-p-toluene sulfonate and flaked using conventional techniques. The analytical results are set forth in Table I.

EXAMPLES 3–7

Branched epoxy resins were prepared using the methods and materials of Example 2 except that different deactivators were employed in the various amounts set forth in Table I.

The melt viscosity of each of the resulting branched epoxy resins was also measured. These results are set forth in Table I. To determined the effectiveness of each of the deactivators employed, the epoxy equivalent weight (EEW) of each of the branched epoxy resins was measured immediately following branching (i.e., immediately upon the addition of the deactivator to the branched reaction product and after the quenching and flaking operations). In addition, the melt viscosity of each of the branched epoxy resin products was also measured. These results are also presented in Table I.

TABLE I

| | EXAMPLE NO. | | | | | |
|---|---|---|---|---|---|---|
| | 2 | 3 | 4 | 5(1) | 6(2) | 7(2) |
| Deactivator(3) | | | | | | |
| Type | MPTS | DEO | TMP | DMS | MSM | EPTS |

TABLE I-continued

| | EXAMPLE NO. | | | | | |
|---|---|---|---|---|---|---|
| | 2 | 3 | 4 | 5(1) | 6(2) | 7(2) |
| Concentration, ppm | 400 | 300 | 400 | 80 | 120 | 220 |
| Reaction Product(4) | | | | | | |
| After Branching, | | | | | | |
| Before Flaking | | | | | | |
| EEW | 580 | 538 | 523 | 583 | 603 | 604 |
| % Epoxide | 7.41 | 7.99 | 8.23 | 7.38 | 7.13 | 7.12 |
| Melt Viscosity | 24.8 | 10.4 | 7.6 | 22.8 | 43.2 | 44.0 |
| at 150° C., poise | (2.48) | (1.04) | (0.76) | (2.28) | (4.32) | (4.40) |
| (Pa.s) | | | | | | |
| After Flaking | | | | | | |
| EEW | 591 | 575 | 559 | 591 | 606 | 607 |
| Melt viscosity | 29.0 | 19.2 | 15.6 | 26.4 | 44.0 | 45.6 |
| at 150° C., poise | (2.90) | (1.92) | (1.56) | (2.64) | (4.40) | (4.56) |
| (Pa.s) | | | | | | |

(1)The LiOH branching catalyst was employed at 0.015 g (5.4 ppm of lithium calculated as elemental lithium based on the total weight of the epoxy resin and phenol components) in Example 5.
(2)The LiOH branching catalyst was employed in an amount of 0.01 g (3.6 ppm of lithium calculated as elemental lithium based on the total weight of the epoxy resin and phenol components) in Examples 6 and 7.
(3)The type of deactivator is set forth in abbreviated form wherein:
MPTS = methyl-p-toluene sulfonate
DEO = diethyl oxalate
TMP = trimethyl phosphate
DMS = dimethyl sulfate
MSM = methylester of methane sulfonic acid (methyl methane sulfonate)
EPTS = ethyl-p-toluene sulfonate
The concentration of the deactivator is set forth in parts per million based on the total weight of the epoxy resin and polyol components in the reaction mixture. (4) After Branching, Before Flaking means the reaction product at the time when the deactivator was added whereas After Flaking means the final reaction product.

As evidenced by the data set forth in Table I, the method of the present invention is found to effectively branch the epoxy resin. This branching is evidenced by the decrease in the reaction mixture of the percent epoxide as compared to the theoretical percent epoxide in the mixture subsequent to advancement. In addition, the various materials employed as deactivators are shown to have different deactivation effects. Specifically, as evidenced by the little increase in EEW between deactivator addition and in the final product, after flaking, methyl-p-toluene sulfonate, methyl-methane sulfonate, ethyl-p-toluene sulfonate and dimethyl sulfate are found to be the most effective deactivators. Although not as effective as methyl-p-toluene sulfonate and dimethyl sulfate; diethyl oxalate and trimethyl phosphate are also shown to be effective deactivators as evidenced by the relatively small increase in EEW of the branched epoxy resin during flaking.

EXAMPLE 8

To a suitably sized reaction vessel as employed in Example 1 was added 800 g of a mixture containing 608.2 g of a diglycidyl ether of bisphenol A and 191.8 g of bisphenol A. In general, a difunctional linear, advanced epoxy resin made from this reactant mixture contains 8.96 percent epoxide. The reaction vessel was heated to 90° C. When the contents of the reaction vessel obtained this temperature, 0.2 g of a 70 percent solution of ethyl triphenyl phosphonium acetate-acetic acid complex advancement catalyst in methanol and 1.6 g of a ten percent solution of lithium bisphenolate in a 1:1 weight mixture of methanol and water were added to the reaction vessel. This level of branching catalyst was calculated at 5.9 ppm lithium as elemental lithium based upon the weight of the epoxy resin and the bisphenol A, or 7.8 ppm based only upon the weight of the epoxy resin. The resulting reaction mixture was heated to 150° C. The reaction was then allowed to exotherm, with the maximum temperature reaching 203° C.

The reaction mixture was maintained at 180° C. for an additional 1 hour and 45 minutes at which time the desired EEW was obtained. At this time, 0.16 g of methyl-p-toluene sulfonate was added, in one shot, to the reaction mixture. The reaction mixture was maintained at 180° C. for an additional 4 hour period to homogenously mix the deactivator through the reaction mixture and to sufficiently terminate the branching chain propagation. Subsequent to this treatment, the reaction mixture was flaked using conventional techniques.

EXAMPLES 9-14

Using the techniques and materials of Example 8, branched epoxy resins are prepared using the same proportions of the diglycidyl ether or bisphenol A, bisphenol A and advancement catalyst and different branching catalysts at the various concentrations set forth in Table II. The epoxy equivalent weights, before and after flaking and the melt viscosity of each of the epoxy resins prepared in Examples 8-14 were measured and are set forth in Table II.

TABLE II

| | EXAMPLE NO. | | | | | | |
|---|---|---|---|---|---|---|---|
| | 8 | 9 | 10 | 11 | 12 | 13 | 14 |
| Branching Catalyst, Type(2) | LiB | Li$_2$CO$_3$ | Li—p-T | LiN | LiA | LiNO$_3$ | C$_5$OH |
| Concentration of Compound, ppm based upon wt. of epoxy resin and bisphenol A | 200 | 31 | 200 | 290 | 80 | 58 | 140 |
| Calculated as element, ppm based upon wt of epoxy resin | 5.9 | 5.8 | 8.5 | 12.1 | 8.4 | 5.8 | 124 |

TABLE II-continued

| | EXAMPLE NO. | | | | | | |
|---|---|---|---|---|---|---|---|
| | 8 | 9 | 10 | 11 | 12 | 13 | 14 |
| and bisphenol A based upon wt of epoxy resin alone | 7.8 | 7.6 | 11.2 | 15.9 | 11.1 | 7.7 | 163 |
| Reaction (Cook-Down) Time at 180° C., min | 105 | 255 | 125 | 120 | 63 | 105 | 240 |
| Reaction Product(3) After Branching, | | | | | | | |
| Before Flaking | | | | | | | |
| EEW | 575 | 509 | 545 | 611 | 577 | 598 | 525 |
| % Epoxide | 7.47 | 8.45 | 7.89 | 7.04 | 7.45 | 7.19 | 8.17 |
| Melt Viscosity at 150° C. poise (Pa.s) | 24.6 (2.46) | 7.0 (0.70) | 16.8 (1.68) | 49.6 (4.96) | 28.0 (2.80) | 40.0 (4.00) | 8.5 (8.50) |
| After Flaking | | | | | | | |
| EEW | 585 | 512 | 549 | 615 | 588 | 606 | 526 |
| Melt Viscosity at 150° C., poise (Pa.s) | 27.0 (2.70) | 7.2 (0.72) | 17.2 (1.72) | 55.0 (5.50) | 32.0 (3.20) | 43.2 (4.32) | 8.5 (0.85) |

(1)The reactants are set forth in abbreviated form wherein
DGEBA = diglycidyl ether of bisphenol A
BA = bisphenol A
Percent epoxide is the percent (weight) of epoxy groups in the reaction product at the time of addition of the deactivator. The percentage is determined by the method described in The Handbook of Epoxy Resins by H. Lee and K. Neville, published in 1967 by McGraw-Hill, New York, pages 4-14 to 4-18.
(2)Some of the lithium and cesium compounds used as branching catalysts are set forth in abbreviated form wherein:
LiB = lithium bisphenolate
Li—p-T = lithium tosylate
LiN = lithium naphthenate
LiA = lithium acetate
(3)Same as footnote (4) in Table I.

As evidenced by the data set forth in Table II, the various lithium salts and cesium hydroxide are effective in preparing a branched epoxy resin. The speed or rate of branching is dependent on the specific lithium salt employed as a branching catalyst and can be determined by the time and temperature required to reduce the number of epoxy groups to a desired level and to achieve a desired epoxy equivalent weight. For example, lithium nitrate is found to be an extremely effective catalyst in that an epoxy equivalent weight of 598 is obtained after only 1 hour and 45 minutes reaction temperature. Alternatively, due to its insolubility in the reaction mixture, lithium carbonate is not found to be as effective. Specifically, after reaction of 4 hours and 15 minutes at 180° C., the percent epoxy in the reaction mixture is not as significantly reduced and the epoxy equivalent weight remains low. However, since there is some reduction in the percent epoxide with coincident increase in the epoxy equivalent weight, branching does occur and lithium carbonate can be employed in the method of the present invention. In addition, the cook-down time was maintained to obtain an epoxy resin having the epoxy equivalent weight as set forth in Table I.

EXAMPLE 15

To a reaction vessel similar to the reaction vessel used in Example 1 except fitted with a reflux condenser was added 403.5 g of a liquid diglycidyl ether of bisphenol A having an EEW of 187 and 196.5 g of tetrabromobisphenol A. The reaction mixture was heated to 100° C. When the reaction mixture reached this temperature, 0.3 g of a 70 percent solution of ethyl triphenyl phosphonium acetate-acetic acid complex in methanol and 0.12 g of a ten weight percent solution of LiOH in water was added to the reaction vessel. The active amount of the LiOH branching catalyst was 20 parts per million parts of the reaction mixture. This level of branching catalyst was calculated as 5.8 ppm of lithium as elemental lithium based upon the weight of the epoxy resin and the tetrabromobisphenol A, or 8.6 ppm based only upon the weight of the epoxy resin. The reaction mixture was heated to 150° C. and maintained at this temperature (avoiding any exothermic reaction by cooling) until the percent epoxy groups in the reaction mixture was measured at 8.89 percent as compared to the 10.29 weight percent of epoxy in the advanced reaction product without branching. This was reached after maintaining the reaction mixture at 150° C. for 170 minutes.

At this time, 200 g of acetone diluent were slowly added to the reaction and the reaction mixture was gradually cooled to room temperature. The addition of the diluent and the refluxing from the reflux condenser rapidly cooled the reaction mixture and effectively stopped the branching reaction. The resulting solution of the branched, brominated epoxy resin had a kinematic viscosity of 549 centistokes (0.000549 m²/s) at a 75 percent solids content as measured using a Cannon-Fenske viscometer at 25° C. and an EEW of 484.

An impregnation varnish suitable for use in the preparation of pre-pregs and copper clad laminates for the manufacture of circuit boards was prepared by mixing 133 parts of the resin solution (100 parts resin based on solids content) with 3.5 parts of dicyandiamide, 0.2 parts of benzyldimethylamine and 30 parts of a solvent blend consisting of equal amounts of dimethylformamide and ethylene glycol monomethylether. The resulting varnish had a gel time of 200 seconds when measured on a hot plate at 175° C. The fully cured resin film prepared from t eh varnish exhibited a glass transition temperature of 133° C. Alternatively, a cured resin film prepared using a commercially available brominated resin of the same EEW exhibited a glass transition temperature of only 123° C.

EXAMPLE 16.

To a reaction vessel identical to that employed in Example 1 was added 800 g (4.30 equivalents) of a liquid diglycidyl ether of a polypropylene glycol having an average EEW of 186. The resin was carefully heated, with agitation, to a temperature of 180° C. When the resin reached this temperature, 180 parts of lithium chloride per 1 million parts of the resin were added to the reaction vessel. This level of branching catalyst was calculated as 29.5 ppm of lithium as elemental lithium based upon the weight of the epoxy resin. The temperature of the resulting mixture was maintained at 180° C. for 5.2 hours. At this time, the desired EEW of 270 was obtained.

Following the obtention of the desired EEW, 1000 parts per million parts of resin of methyl-p-toluene sulfonate were added to the reaction vessel. This mixture was maintained at 180° C. for 30 minutes, at which time the resin was poured from the reaction vessel and cooled to room temperature. The resulting resin had an average EEW of 272.

EXAMPLE 17

To a reaction vessel identical to that employed in Example 1 was added 567.7 g of a liquid diglycidyl ether bisphenol A having an average EEW of 179.6 and 182.3 g of bisphenol A having an average phenolic hydroxyl equivalent weight of 114. The resulting reaction mixture was heated to 95° C. at which time 175 parts of ethyltriphenyl phosphonium acetate-acetic acid complex advancement catalyst per one million parts of the reaction mixture were added to the reaction vessel. After the reaction mixture reached a peak exothermic temperature of 186° C. the now advanced epoxy resin had reached an EEW of 480. It was maintained, with agitation, at 180° C. for an additional hour.

At that time, 250 g of diethylene glycol monobutylether were added to the reaction mixture to prepare a solution of 75 weight percent solids. After homogeneously mixing the diethylene glycol monobutylether with the reaction mixture and heating the reaction mixture back to 180° C., 18 parts of lithium chloride were added to the reaction mixture per one million parts of the reaction mixture solids. The level of branching catalyst was calculated as 2.9 ppm of lithium as elemental lithium based on the weight of the epoxy resin and the bisphenol A, or 3.8 ppm based on the weight of only the epoxy resin. The temperature of the reaction mixture was maintained at 180° C. for three hours. At this time, the EEW had reached the desired value of 606 and 200 parts of methyl-p-toluene sulfonate per million parts of resin solids were added to the reaction mixture. The reaction mixture was maintained at 180° C. for 2 hours and then cooled to room temperature and poured from the reaction vessel. The resulting branched epoxy resin had an average EEW of 617. The resulting resin solution had a Kinematic viscosity of 1290 (0.001290 m²/s) at 75 percent solids and 80° C. As evidenced by this Example, lithium compounds such as lithium chloride can be added after advancement of the resin to catalyze branching of the advanced epoxy resin.

EXAMPLE 18

To a suitably sized reaction vessel was added 1 kg of an advanced epoxy resin of a solid diglycidyl ether of bisphenol A having an average EEW of 480. The resin was carefully heated to a molten state, with agitation, and subsequently heated to 180° C. Af this time, 18 parts of lithium chloride as a 5 weight percent solution in n-butanol, per one million parts of the solid epoxy resin were added to the reaction mixture. This level of branching catalyst was calculated as 2.9 ppm of lithium as elemental lithium based on the weight of the epoxy resin. The reaction mixture was maintained at 180° C. for 2.3 hours at which time the reaction product had reached the desired EEW of 590.

At this time, 200 parts of methyl-p-toluene sulfonate per million parts of the solid epoxy resin were added in one shot to the reaction mixture. The reaction mixture was maintained at 180° C. for 30 minutes at which time it was poured out and cooled to room temperature and flaked. The resulting resin had an average EEW of 590 and a melt viscosity of 30 poise (3.0 Pa.s) at 150° C.

As evidenced by this example, the lithium chloride was suitably employed as a catalyst for branching the advanced epoxy resin.

EXAMPLE 19

The methods of Example 18 were repeated except to branch a liquid diglycidyl ether of bisphenol A having an average EEW of 180 and using 180 parts of lithium chloride, as a 5 weight percent solution in n-butanol, per one million parts of the liquid epoxy resin. This level of branching catalyst was calculated as 29.5 ppm of lithium as elemental lithium based on the weight of the epoxy resin. The lithium chloride was found to again catalyze the branching of the liquid epoxy resin and the reaction product was found to have an EEW of 235.

What is claimed is:

1. A method for increasing the functionality of an epoxy resin which comprises branching the epoxy resin in the presence of an amount of lithium or cesium compound sufficient to catalyze the branching reaction, continuing the branching reaction until desired functionality is obtained and thereafter terminating the branching reaction, said epoxy resin having been advanced from one molecular weight to a higher molecular weight by reaction with a coreactive chain extender in the presence of an advancement catalyst, prior to branching the epoxy resin.

2. The method of claim 1 wherein the lithium compound is represented by the general structural formula $Li_mX$ wherein X is an anionic moiety and m is the valence of the anion.

3. The method of claim 2 wherein X is a halide, hydroxyl, the anion of an inorganic or organic acid, a moiety containing a heteroatom, or —OR or —R wherein R is a hydrocarbon or inertly substituted hydrocarbon.

4. The method of claim 3 wherein the lithium compound is employed in an amount from about 0.1 to about 300 parts of lithium calculated as elemental lithium per million parts of the epoxy resin components in the branching reaction mixture.

5. The method of claim 1 wherein the branching reaction is terminated by adding a deactivating agent which stops or effectively reduces the rate of the branching reaction even at temperatures required to maintain the branched reaction product in a molten or liquid state.

6. The method of claim 5 wherein the deactivating agent is a strong inorganic acid; an inorganic acid ester, half ester or partial ester; an inorganic acid anhydride; a strong organic acid; an ester of a strong organic acid or an anhydride of a strong organic acid 7. The method of claim 6 wherein the deactivating agent is an alkyl, aryl or aralkyl sulfonic acid or an ester or anhydride of such acids.

8. The method of claim 7 wherein the deactivating agent is p-toluene sulfonic acid, methyl or ethyl-p-toluene sulfonate and p-toluene sulfonic acid anhydride.

9. The method of claim 5 wherein the deactivating agent is added to the branching reaction mixture in an amount of at least one equivalent per equivalent of the branching catalyst employed.

* * * * *

UNITED STATES PATENT AND TRADEMARK OFFICE
CERTIFICATE OF CORRECTION

PATENT NO. : 4,795,791

DATED : January 3, 1989

INVENTOR(S) : Raymond A. Koenig, and Gunter H. Haertel

It is certified that error appears in the above-identified patent and that said Letters Patent is hereby corrected as shown below:

Column 2, line 10, "0.5" should read --0.05--; and
        line 58, "rein" should read --resin--.

Column 3, line 33, "3,980,719" should read --3,970,719--.

Column 4, line 23, "carbolyic" should read --carboxylic--.

Column 6, line 12, "rein" should read --resin--.

Column 7, line 47, "oniom" should read --onium--; and
        line 55, "oniom" should read --onium--.

Column 9, line 51, "being being" should read --being between--.

Column 12, line 53, "or bisphenol A" should read --of bisphenol A--.

Column 14, line 64, "t eh" should read --the--.

Signed and Sealed this

Twenty-first Day of August, 1990

*Attest:*

HARRY F. MANBECK, JR.

*Attesting Officer*      *Commissioner of Patents and Trademarks*